United States Patent [19]

Schrager

[11] Patent Number: 4,629,242

[45] Date of Patent: Dec. 16, 1986

[54] PATIENT TRANSPORTING VEHICLE

[75] Inventor: James E. Schrager, Flossmoor, Ill.

[73] Assignee: Colson Equipment, Inc., Caruthersville, Mo.

[21] Appl. No.: 820,880

[22] Filed: Jan. 16, 1986

Related U.S. Application Data

[63] Continuation of Ser. No. 518,383, Jul. 29, 1983, abandoned.

[51] Int. Cl.[4] .......... B60R 13/00

[52] U.S. Cl. .......... 296/20; 5/282 R; 5/86; 403/390; 280/784

[58] Field of Search .......... 296/19, 20, 35.2; 280/784, 785, 788, 283, 647, 652; 5/85, 86, 110–112, 282 R, 81 R; 267/5, 63 R, ; 297/DIG. 4; 403/224, 388, 390; 248/615, 635, 638

[56] References Cited

U.S. PATENT DOCUMENTS

| | | | |
|---|---|---|---|
| 629,585 | 7/1899 | McCall | 280/283 |
| 1,616,740 | 2/1927 | Chalfant | 296/20 |
| 2,172,611 | 9/1939 | Gerhardt et al. | 403/390 |
| 2,244,122 | 6/1941 | Scudder | 296/20 |
| 2,561,156 | 7/1951 | Thorkildsen | 267/63 R |
| 3,115,646 | 12/1963 | Lee | 5/81 R |
| 3,177,962 | 4/1965 | Bailey | 267/63 R |
| 3,341,246 | 9/1967 | Lavallee | 296/20 |
| 3,386,111 | 6/1968 | Daniel | 5/86 |
| 4,311,407 | 1/1982 | Doyle | 403/390 |

FOREIGN PATENT DOCUMENTS

| | | | |
|---|---|---|---|
| 789577 | 10/1935 | France | 296/20 |
| 1302708 | 7/1962 | France | 296/20 |
| 952534 | 3/1964 | United Kingdom | 296/20 |

*Primary Examiner*—Robert B. Reeves
*Assistant Examiner*—Dennis H. Pedder
*Attorney, Agent, or Firm*—Neuman, Williams, Anderson & Olson

[57] ABSTRACT

A vehicle is provided for use in hospitals, clinics, and medical facilities for transporting patients between various locations while in a prone, reclining, or sitting position. The vehicle includes a first member on which the patient is placed, and a second member disposed beneath the first member and in supporting engagement therewith. The second member, sometimes referred to as the undercarriage, includes an elongated flexible chassis having a center section and endwise offset end segments. Disposed at opposite ends of the chassis and secured to corresponding end segments are depending end sections. Wheels or the like are attached to the depending end sections. Resilient, shock-absorbing elements are interposed the end sections and the offset end segments secured thereto whereby external forces impacted on the wheels while the vehicle is in motion are substantially absorbed by the resilient elements and by chassis flexure.

31 Claims, 8 Drawing Figures

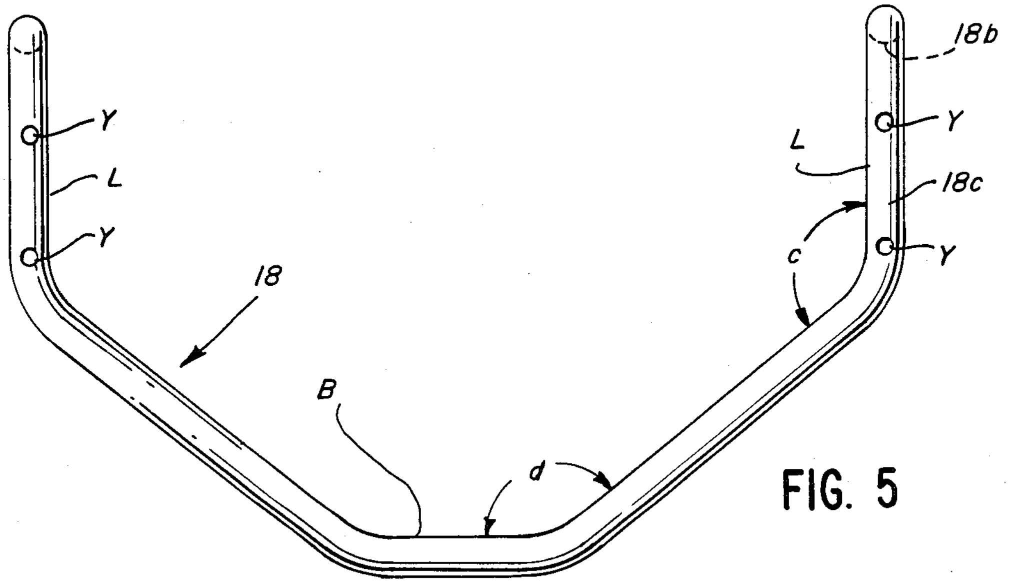
FIG. 5
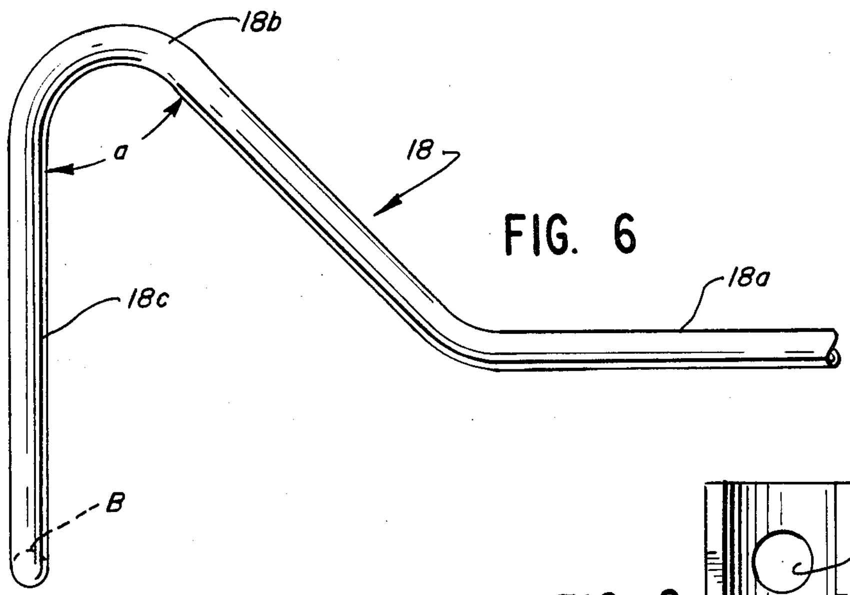
FIG. 6
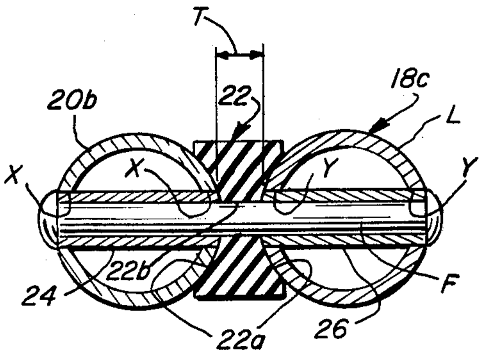
FIG. 7
FIG. 8
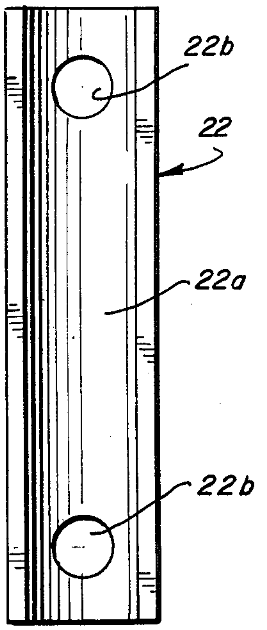

PATIENT TRANSPORTING VEHICLE

This application is a continuation of application Ser. No. 518,383, filed July 29, 1983, now abandoned.

BACKGROUND OF THE INVENTION

Various types of patient transporting vehicles, commonly referred to as mobile stretchers, have heretofore been provided for use in hospitals, clinics, and various other medical facilities for moving a patient from one location to another while the patient is in a prone, reclining, or sitting position. Such vehicles are normally provided with a plurality of wheels, casters or the like, of which one or more is of a swivel type to facilitate steering of the vehicle. The axles of the wheels are oftentimes fixedly secured to the underside of a rigid frame which supports at a predetermined elevation a patient supporting member, sometimes referred to as the litter. In other situations the wheels are disposed in bearings which have external stems or stubs which in turn are disposed within sockets rigidly affixed to the frame underside. In either situation, because of the manner in which the wheels are affixed to the frame, any lateral forces impacting on the wheels due to the latter striking a curb, stanchion, or other floor projection while the vehicle is in motion causes the connection between the wheel and the underside of the frame to be weakened and eventually to fracture or become seriously damaged. In addition, such forces are frequently transmitted through the rigid frame and litter to the patient, causing discomfort and pain to the patient being transported. Thus, in order to withstand the shock forces to which the wheels of the vehicle are frequently subjected and for reasons of safety and stability, it has been customary in prior vehicles of this general type for the frames to be inordinately massive, heavy and rigid structures and accordingly expensive and difficult to manually maneuver, and the wheels, casters, or the like connected thereto to be reinforced.

SUMMARY OF THE INVENTION

Thus, it is an object of the invention to provide a patient transporting vehicle which effectively overcomes the aforenoted shortcomings besetting prior vehicles of this general type.

It is a further object to provide a vehicle of the type described which may be readily maneuvered by a single individual even when the vehicle is accommodating a large and/or heavy adult patient.

It is a further object to provide a vehicle of the type described wherein the various components thereof, particularly those comprising the undercarriage, do not obstruct persons attending the patient while the latter is disposed on the vehicle.

It is a further object to provide a vehicle wherein the undercarriage thereof is of simple, streamline design with no exposed sharp corners or edges which would scratch or injure the person or persons attending the patient, or tear or deface the garments worn by such persons.

It is a further object to provide a vehicle having an undercarriage which is capable of accommodating and supporting a variety of litters which vary in size and shape over a wide range.

It is a still further object to provide a patient transporting vehicle which may be readily serviced when desired.

Further and additional objects will appear from the description, accompanying drawings, and appended claims.

In accordance with one embodiment of the invention, a patient transporting vehicle is provided which includes a first member in supporting, subtending engagement with the patient when the latter is in a prone, reclining, or sitting position. Subtending and supporting the first member is a second member or undercarriage. The second member includes a chassis having an elongated center section with endwise offset end segments. Connected to corresponding end segments are depending end sections. Interposed each end segment and the end section connected thereto is a resilient, shock-absorbing element. Attached to the depending end sections are wheel means. When either vertical or lateral external forces impact on the wheel means which normally occur while the vehicle is in motion, such forces are substantially absorbed by the resilient elements rather than being transmitted through the chassis to the first member. Any portion of an external force not fully absorbed by the resilient elements is transferred to the end sections or to the end segments of the chassis which flex in a springlike fashion to absorb the force.

DESCRIPTION

For a more complete understanding of the invention, reference should be made to the drawings wherein:

FIG. 5 is an enlarged end elevational view of the chassis of the undercarriage shown in FIG. 2.

FIG. 6 is an enlarged fragmentary side elevational view of the chassis per se and showing only one end segment, one terminal portion, and a center rail section thereof.

FIG. 7 is an enlarged fragmentary sectional view taken along line 7—7 of FIG. 1.

FIG. 8 is an enlarged side elevational view of the resilient, shock-absorbing element per se shown in FIG. 7.

Figure 1:
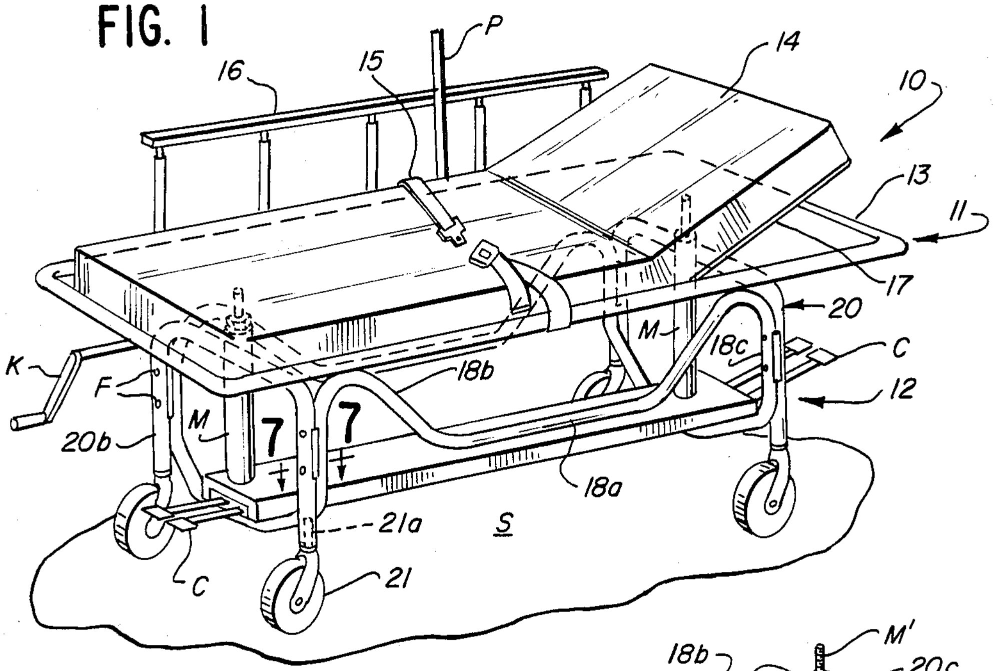
FIG. 1 is a perspective side view of one embodiment of the improved vehicle and showing a head portion of the patient-supporting first member in a slightly raised or tilted position.

Referring now to the drawings and more particularly to FIG. 1, one form of the improved patient transporting vehicle 10 is shown. Vehicles of this general type are commonly utilized in hospitals, clinics, and various medical facilities for moving patients between various locations while the patient is in a prone, reclining, or sitting position. In certain instances, where the patient is too sick or would endure severe discomfort to be moved from the vehicle onto an operating or X-ray table, or onto a hospital bed or the like, the patient may remain on the vehicle for prolonged periods of time while being treated. Thus, the vehicle 10 must provide comfort and security for the patient; must not obstruct the doctor, nurse, or attendant when they are administering treatment or aid to the patient; and must be readily maneuverable manually when required without causing discomfort or inconvenience to the patient as well as to the person moving the vehicle.

As shown, vehicle 10 includes an elongated first member 11, sometimes referred to as a litter, which is supported in selected elevated positions by a second member 12 normally referred to as the undercarriage. The first member 11 may vary in size and shape from that shown, but basically includes a planar frame unit 13 which normally assumes a horizontal elevated position. Overlying the frame unit 13 is a mattress or pad 14 on which the patient is positioned. One or more suitable security straps 15 are carried on the unit which are adjustable so as to embrace the patient and retain the latter in a desired position on the mattress. In addition to the straps, the frame unit 12 may be provided with vertically adjustable side, head, and feet rails or gates 16. Also suitable sockets, not shown, may be provided about the periphery of the frame unit to accommodate a support pole P for suspending bottles or sacks of intravenous fluids, or monitoring apparatus.

The frame unit 13 has a center mattress support member 17 which may be of sectional construction allowing the head portion and/or foot portion of the mattress to be raised or tilted. The frame unit, mattress, and the various accessories heretofore described are per se of conventional design.

Figure 2:
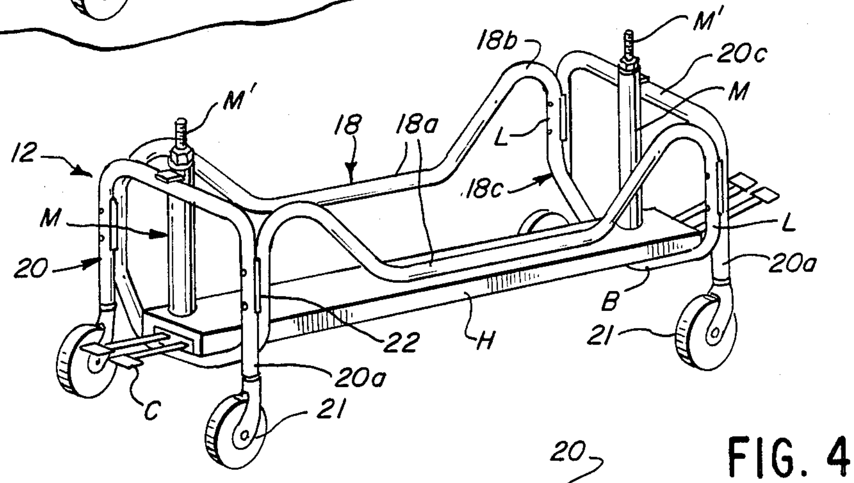
FIG. 2 is a fragmentary, perspective view of the undercarriage per se of the vehicle of FIG. 1.

The second member 12 of the vehicle 10 is shown more clearly in FIG. 2 and includes a chassis 18 preferably of tubular construction; end sections 20 disposed at opposite ends of the chassis; wheels or the like 21 connected to the lower ends **20*a* of the end sections and engaging a floor surface S or the like; and resilient shock-absorbing inserts or elements 22** to be described more fully hereinafter.

The chassis 18, as seen more clearly in FIGS. 5 and 6, is preferably of one-piece tubular construction and includes a center section **18*a* formed of a pair of laterally spaced rail sections, terminal portions 18*b* at opposite ends of the rail sections, and end segments 18*c* offset endwise from the rail sections and integrally connected thereto by the terminal portions 18*b***.

Figure 3:
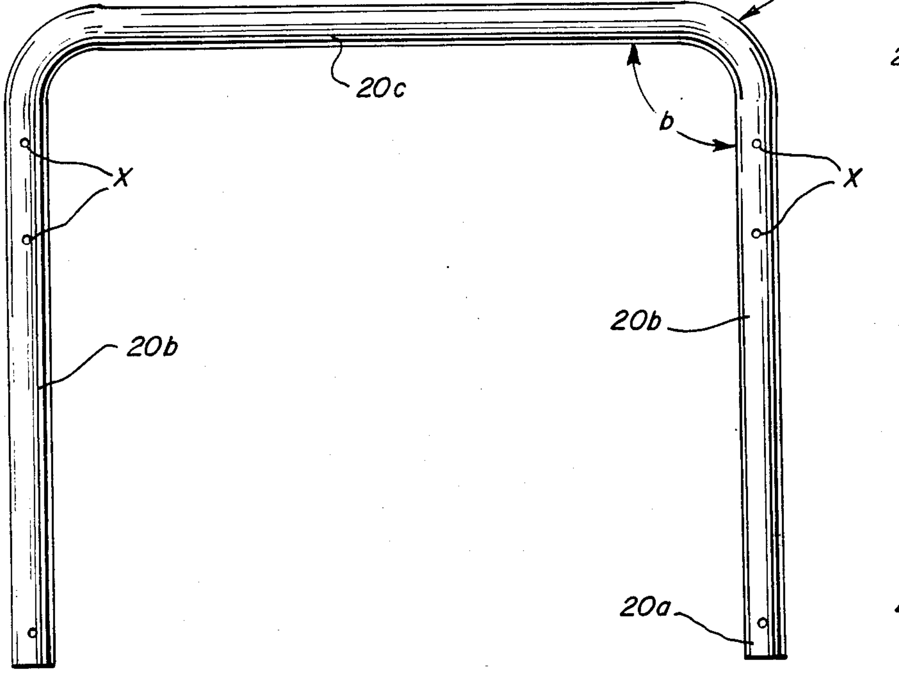
FIG. 3 is an enlarged end elevational view of one of the end sections forming a component of the undercarriage shown in FIG. 2.
Figure 4:
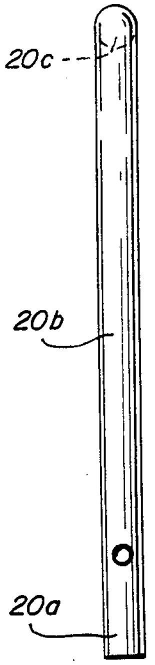
FIG. 4 is a side elevational view of the end section of FIG. 3.

Each of the end segments **18*c* in the illustrated embodiment has a similar U configuration with the legs L thereof extending vertically and having the lower ends thereof interconnected by a bail portion B, see FIG. 5. The upper end of each leg L is integrally connected to a corresponding end of a center section rail section 18*a* by one of the terminal portions 18*b*. In order to effect endwise offsetting of the end segments 18*c* from the rail sections 18*a*, the terminal portions 18*b* are bent or curved to form an inverted J shape or some other similar configuration. Thus, by reason of the end segments being endwise offset, they are slightly resilient and will yield inwardly a slight amount when the wheels 21 are impacted by external lateral forces longitudinally of the chassis 18 or substantially perpendicular to the bail B of endwise offset end segment 18*c* caused by striking curbs, stanchions, or other floor mounted projections when the vehicle 10 is moving along the surface S. Such an external lateral force substantially perpendicular to the bail B of endwise offset end segment 18*c* would be in a direction going into the paper as shown in FIG. 5. In FIG. 6 such an impact force causes the angle "a" between the end segments 18*c* and terminal portions 18*b* to momentarily decrease. Thus, rather than having the impact forces concentrated on the wheel itself or its connection to the end section, the force is widely distributed throughout the end section, one or more shock-absorbing inserts 22, and an end segment thus, materially reducing the possibility of the wheels and their associated parts being weakened or seriously damaged. As will be described more fully hereinafter, the inserts 22 effectively absorb most of the external shock forces As shown in FIGS. 3 and 4, the end sections 20 are preferably of tubular construction and have an inverted U configuration. The legs 20*b* are vertically disposed and positioned in parallel side-by-side relation with the corresponding legs L of the adjacent end segments 18*c*. The cross segment 20*c* joins together vertical legs 20*b*. The lower end 20*a* of each leg 20*b* is sized to provide a socket for a vertical stem or stub 21*a* of the wheel 21, see FIG. 1**.

The inverted U-shaped end section 20 of FIG. 3 and the substantially U-shaped endwise offset end segment **18*c* of FIG. 5 are slightly resilient and are constructed and assembled to yield inwardly a slight amount when the wheels 21 are impacted by external lateral forces substantially parallel to the bail B of endwise offset end segments 18*c* caused by striking curbs, stanchions, or other floor mounted projections when the vehicle 10 is moving along the surface S. Such an external lateral force transversely of the chassis 18 or substantially parallel to the bail B of endwise offset end segment 18*c* would be in a direction going into the paper as shown in FIG. 6. Such an impact force causes the end section and the end segment to yield inwardly as stated above, and the angle "b" between the cross segment 20*c* and legs 20*b* of FIG. 3 and the angles "c" and "d" of FIG. 5** to momentarily fluctuate in magnitude.

Vertical forces caused by the vehicle 10 moving from one horizontal surface to a lower horizontal surface such as from a sidewalk to street level are substantially absorbed by the resilient means 22. When the vehicle 10 is carrying a patient and a large vertical force is encountered the force, due to the weight of the patient, results in a downward force on the bail B of endwise offset end segment **18*c*. Such a downward force causes the angles "c" and "d" of FIG. 5 and to a lesser degree the angle "b" between the connecting leg 20*c* and legs 20*b* of FIG. 3** to fluctuated in magnitude.

Interposed the corresponding legs of the end section 20 and end segment **18*c* is a resilient, shock-absorbing insert or pad 22, see FIG. 7. The insert may be formed of natural rubber (85–90 durometer) or similar material which is not adversely affected by wide variations in temperatures and is resistant to water, a variety of cleaning solutions and the like. As seen in FIG. 7, the insert is elongated and has concave side surfaces 22*a* which conform substantially to exterior curvature of the leg 20*b* or L engaging same. The surfaces are spaced apart from one another by a substantial thickness T of the resilient material, see FIG. 7. Longitudinally spaced openings 22*b* are provided in the insert through which the shank of a fastener F (e.g., bolt or rivet) extends. The insert openings 22*b* are aligned with similar openings X and Y formed in the legs 20*b* and L, respectively, see FIG. 7. The opening Y in the portion L of endwise offset end segments 18*c* are each surrounded by an internal supporting sleeve 24 and the opening X in end sections 20 are each surrounded by a similar internal supporting sleeve 26. The sleeves 24 and 26 are welded or otherwise secured to end segments 18*c* and end sections 20 respectively and are preferably made from a hard material. The sleeves 24 and 26 support the fasteners F and prevent the fasteners F from gouging into the end segments 18*c* and end sections 20** when subjected to vertical impact forces which would otherwise result in the enlarging of the openings Y and X and the weakening of the connections. The exposed openings in each sleeve may be slightly counter-sunk to accommodate the enlarged ends of the fasteners F (e.g., bolt). The number of fasteners F utilized to secure the end sections to the corresponding end segments may be greater than shown if desired.

The upper ends of the legs 20*b* of each end section are interconnected by a substantially horizontal cross segment 20*c*. An adjustable elevating mechanism M of conventional design is secured to horizontal cross segment 20*c* by a non-load bearing tab. In the illustrated embodiment, the mechanism is a hydraulic piston/cylinder assembly with the upper end M' of the piston exposed and suitably connected to the underside of the frame unit 13. The lower end of each mechanism M is secured to an elongated housing H in which are disposed suitable tubing, valves, etc. of conventional design utilized in hydraulic lifting assemblies or jacks of this type. Suitable foot controls C project endwise from the housing H to permit independent adjustment of the mechanism M and effect raising or lowering of the portion of the frame unit 13 engaged by the piston end M'. Other types of adjusting mechanisms (e.g., electric motor; manual rack and gear, etc.) may be utilized, if desired, to effect vertical adjustment of the litter 11. It should be noted that the ends of the housing H are supported by the bail portions B of the chassis end segments 18*c*. Furthermore, it will be observed in FIG. 1, that the chassis 18, end sections 20, wheels 21, adjusting mechanisms M, controls C, and the housing H are recessed inwardly a substantial amount from the outer periphery of the frame unit 13 and thus, do not interfere with the doctor, nurse, or other person attending the patient. The controls C in the illustrated embodiment are located near the head and foot ends of the vehicle 10 In some instances, however, it may be preferred to have all of the controls C for all of the mechanisms disposed at only one location or end of the vehicle. Tilting or raising of a section of center mattress supporting member 17 may be effected manually by a crank handle K or by an electric motor, not shown.

Having the chassis 18 and the end sections 20 formed of bent tubular material, sharp corners or edges are eliminated in the undercarriage 12 and thus, a serious hazard of causing injury to persons attending the patient and/or their garments being torn or defaced has been eliminated. Because of the simple, streamlined design of the undercarriage, it can be readily cleaned and serviced, when required. Furthermore, the undercarriage can readily withstand repeated external shock forces normally encountered without causing permanent or serious damage to the vehicle. In addition, the shock forces are readily absorbed within the undercarriage and are not transmitted so as to cause pain or discomfort to the patient. As aforementioned, the chassis 18 is preferably of one piece tubular construction; if desired, however, the chassis may be formed of two or more tubular sections and then the sections butt-welded or otherwise secured together, so as to provide a unitary or one-piece construction.

What is claimed is:

1. A vehicle for use in transporting a patient in a selected direction along a surface, comprising: a first member for subtending and supportingly engaging the patient at a predetermined elevation relative to the surface; and a second member supportingly engaging said first member, said second member including: a chassis having an elongated center section, first and second end segments disposed transversely of said center section and being integral with said center section, and a terminal portion extending between said center section and each said end segment; first and second depending end sections secured to said first and second end segments of said chassis, respectively; surface-engaging wheel means subtending and attached to said first and second depending end sections; and resilient shock-absorbing means secured between said first depending end section and first end segment and between said second depending end section and said second end segment, whereby said first and second depending end sections are disposed a spaced distance from said first and second end segments, respectively, and whereby external forces impacting on said wheel means while the vehicle is in motion are substantially absorbed by said resilient means and by flexure of the terminal portions.

2. The vehicle of claim 1 wherein said resilient shock-absorbing means transfers to said first and second end segments lateral external forces impacting on said wheel means while the vehicle is in motion and in response to said lateral external forces said end segments flex to absorb said forces.

3. The vehicle of claim 1 wherein said chassis is of tubular construction.

4. The vehicle of claim 1 wherein said end sections are of tubular construction.

5. The vehicle of claim 4 wherein said chassis is of tubular construction.

6. The vehicle of claim 2 wherein the elongated center section of the chassis includes a pair of elongated, horizontally spaced, and substantially straight rail sections of substantially equal length.

7. The vehicle of claim 1 wherein the elongated center section of the chassis includes a pair of elongated, horizontally spaced, and substantially straight rail sections of substantially equal length.

8. The vehicle of claim 1 wherein each of said end segments of said chassis includes a pair of laterally spaced vertical leg portions, each of said leg portions integral with a corresponding one of said terminal portions, and a bail portion connecting said pair of leg portions.

9. The vehicle of claim 8 wherein each pair of leg sections and said interconnecting bail portion define a substantially U-shape.

10. The vehicle of claim 1 wherein each of said end sections includes a pair of spaced substantially vertical elements, each of said pair of vertical elements being secured to a corresponding one of said offset end segments; the lower end of each of said vertical elements being connected to said wheel means.

11. The vehicle of claim 10 wherein each of said end sections includes a cross element interconnecting said pair of vertical elements.

12. The vehicle of claim 11 wherein said pair of vertical elements and said cross element of each end section define a substantially inverted U-shape.

13. The vehicle of claim 11 further comprising an adjustable unit connected to said cross element of at least one of said end sections, said adjustable unit being in supporting engagement with said first member to effect predetermined vertical movement of said first member relative to the surface over which the vehicle transports the patient.

14. The vehicle of claim 11 further comprising an adjustable unit connected to said cross element of each of said end sections, said adjustable units being in supporting engagement with a corresponding end portion of said first member, said units coacting with one another to vary the elevation of said first member relative to the surface over which said vehicle transports the patient.

15. The vehicle of claim 6 wherein each of said terminal portions are of substantially inverted J-shape with one leg thereof integral with an end segment.

16. The vehicle of claim 2 wherein each of said end segments of the chassis includes a pair of laterally spaced vertical leg portions, each of said leg portions integral with a corresponding one of said terminal portions and a bail portion connecting said pair of leg portions.

17. The vehicle of claim 16 wherein each pair of leg sections and said interconnecting bail portion define a substantially U-shape.

18. The vehicle of claim 2 wherein each of said end sections includes a pair of spaced substantially vertical elements, each of said pair of vertical elements being secured to a corresponding one of said offset end segments; the lower end of each of said vertical elements being connected to said wheel means.

19. The vehicle of claim 18 wherein each of said end sections includes a cross element interconnecting said pair of vertical elements.

20. The vehicle of claim 19 wherein said pair of vertical elements and said cross element of each end section define a substantially inverted U-shape.

21. The vehicle of claim 7 wherein each of said terminal portions are of substantially inverted Jshape with one leg thereof integral with an end segment.

22. The vehicle of claim 7 wherein said rail sections, said terminal portions and said first and second end segments being of one-piece, integral construction.

23. A vehicle for use in transporting a patient in a selected direction along a surface, comprising: a first member for subtending and supportingly engaging the patient at a predetermined elevation relative to the surface; and a second member supportingly engaging said first member, said second member including: a chassis having an elongated center section, first and second end segments disposed transversely of said center section and being integral with said center section, and a terminal portion extending between said center section and each said end segment; and first and second depending end sections respectively secured to said first and second end segments of said chassis; surface engaging wheel means attached to said first and second depending end sections whereby external forces impacting on said wheel means while the vehicle is in motion cause said first and second end segments and said terminal portions to flex and absorb said forces.

24. A vehicle of claim 23 further comprising resilient shock-absorbing means secured between said first depending end sections and said first end segment and between said second depending end section and said second end segment.

25. The vehicle of claim 23 wherein said chassis is of tubular construction.

26. The vehicle of claim 23 wherein said end sections are of tubular constructions.

27. The vehicle of claim 26 wherein said chassis is of tubular construction.

28. The vehicle of claim 23 wherein the elongated center section of the chassis includes a pair of elongated, horizontally spaced, and substantially straight rail sections of substantially equal length.

29. The vehicle of claim 28 wherein the first end segment is connected to said curved terminal portions at said first end of said chassis and the second end segment is connected to said curved terminal portions at said second end of said chassis, said end segments and said curved terminal portions forming a predetermined angle whereby an external force substantially longitudinal to said chassis causes said predetermined angle to momentarily decrease.

30. The vehicle of claim 29 wherein each of said end segments of said chassis includes a pair of laterally spaced vertical leg portions, each of said leg portions integral with a corresponding one of said terminal portions and a bail portion connecting said pair of leg portions.

31. The vehicle of claim 30 wherein each of said end sections includes a pair of spaced substantially vertical elements, each of said pair of vertical elements being secured to a corresponding one of said first and second end segments; the lower end of each of said vertical elements being connected to said wheel means; and a cross element interconnecting said pair of vertical elements.

* * * * *